(12) United States Patent
Singh et al.

(10) Patent No.: US 11,017,296 B2
(45) Date of Patent: May 25, 2021

(54) CLASSIFYING TIME SERIES IMAGE DATA

(71) Applicant: Ford Global Technologies, LLC, Dearborn, MI (US)

(72) Inventors: Gaurav Kumar Singh, Westland, MI (US); Pavithra Madhavan, Westland, MI (US); Bruno Jales Costa, Sunnyvale, CA (US); Gintaras Vincent Puskorius, Novi, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 163 days.

(21) Appl. No.: 16/108,698

(22) Filed: Aug. 22, 2018

(65) Prior Publication Data

US 2020/0065663 A1 Feb. 27, 2020

(51) Int. Cl.
| | |
|---|---|
| *G06K 9/62* | (2006.01) |
| *G06N 3/08* | (2006.01) |
| *G06N 3/04* | (2006.01) |
| *G06K 9/00* | (2006.01) |
| *G06T 7/246* | (2017.01) |

(52) U.S. Cl.
CPC ........... *G06N 3/08* (2013.01); *G06K 9/00335* (2013.01); *G06N 3/0454* (2013.01); *G06T 7/246* (2017.01)

(58) Field of Classification Search
CPC .... G06N 3/08; G06N 3/0454; G06K 9/00335; G06T 7/246

USPC .......................................................... 382/156
See application file for complete search history.

(56) References Cited

U.S. PATENT DOCUMENTS

| 8,300,935 | B2 | 10/2012 | Distante | |
|---|---|---|---|---|
| 8,345,984 | B2* | 1/2013 | Ji | G06N 3/0454 |
| | | | | 382/190 |
| 9,846,840 | B1* | 12/2017 | Lin | G06N 3/084 |
| 10,510,144 | B2* | 12/2019 | Zur | A61B 1/00009 |
| 2017/0255832 | A1 | 9/2017 | Jones | |

FOREIGN PATENT DOCUMENTS

| CN | 105654037 | 6/2016 |
|---|---|---|
| CN | 107133973 | 9/2017 |
| CN | 107506756 | 12/2017 |
| CN | 107679491 | 2/2018 |

\* cited by examiner

*Primary Examiner* — Huy C Ho
(74) *Attorney, Agent, or Firm* — David R. Stevens; Stevens Law Group (57) ABSTRACT

The present invention extends to methods, systems, and computer program products for classifying time series image data. Aspects of the invention include encoding motion information from video frames in an eccentricity map. An eccentricity map is essentially a static image that aggregates apparent motion of objects, surfaces, and edges, from a plurality of video frames. In general, eccentricity reflects how different a data point is from the past readings of the same set of variables. Neural networks can be trained to detect and classify actions in videos from eccentricity maps. Eccentricity maps can be provided to a neural network as input. Output from the neural network can indicate if detected motion in a video is or is not classified as an action, such as, for example, a hand gesture.

20 Claims, 8 Drawing Sheets

FIG. 1

$$\varepsilon_k = \frac{1}{k} + \frac{(x_k - \mu_k)^T(x_k - \mu_k)}{k\sigma_k^2} \quad \sim 201$$

$$\mu_k = \left(\frac{k-1}{k}\right)\mu_{k-1} + \frac{x_k}{k} \quad \sim 202$$

$$\sigma_k^2 = \left(\frac{k-1}{k}\right)\sigma_{k-1}^2 + \frac{(x_k - \mu_k)^T(x_k - \mu_k)}{k-1} \quad \sim 203$$

FIG. 2

$$\mu_k = (1-\alpha)\mu_{k-1} + \alpha x_k \quad \sim 301$$

$$\sigma_k^2 = (1-\alpha)\sigma_{k-1}^2 + \frac{\alpha(x_k - \mu_k)^T(x_k - \mu_k)}{1-\alpha} \quad \sim 302$$

FIG. 3

$$W = [\alpha \ \ \alpha(1-\alpha)^{k-1} \ \alpha(1-\alpha)^{k-2} \ ... \ \alpha(1-\alpha)^{k-K+1} \ ...] \quad \sim\!\!\!-401$$

FIG. 4

$$\varepsilon_k \approx \frac{1}{K} + \frac{(x_k - \mu_k)^T(x_k - \mu_k)}{K\sigma_k^2} \approx \alpha + \alpha \frac{(x_k - \mu_k)^T(x_k - \mu_k)}{\sigma_k^2} \quad \sim\!\!\!-501$$

CLASSIFYING TIME SERIES IMAGE DATA

CROSS-REFERENCE TO RELATED APPLICATIONS

Not applicable.

BACKGROUND

1. Field of the Invention

This invention relates generally to the field of image classification, and, more particularly, to classifying time series image data.

2. Related Art

Convolutional Neural Networks (CNNs) are competent at identifying objects like humans, animals, and vehicles in video on a per frame basis. However, CNNs have difficulty detecting speed and direction of motion of such objects between frames. Representation based solutions that use traditional computer vision techniques to handcraft features can significantly improve detection of speed and direction of motion. However, representation based solutions require sufficient human expertise and are typically not robust to real-world solutions.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for classifying time series image data.

There are a number of techniques for capturing patterns of apparent motion of objects in a visual scene caused by relative motion between an observer and a scene given a set of ordered images. Some techniques include optical flow fields, warped optical flows, successive frame differences, and models inspired on human retina, that can be either finite and infinite impulse response filters or separable and non-separable spatio-temporal components. However, these techniques are computationally expensive limiting their usefulness in real time operations. Moreover, these techniques can be sensitive to optimal choice of complex parameters, often requiring tuning by experts.

Aspects of the invention include encoding motion information from video frames in an eccentricity map. An eccentricity map is essentially a static image that aggregates apparent motion of objects, surfaces, and edges, from a plurality of video frames. Eccentricity map generation is more efficient and effective relative to other techniques. An eccentricity map can be generated with minimal (if any) user-defined parameters and prior assumptions about the data and its distribution. Eccentricity map generation can address concept drift and concept evolution. Eccentricity maps can be provided as input for solving problems that utilize temporal information, such as, for example, human intent recognition, gesture recognition, video description, movement classification, etc.

In general, eccentricity reflects how different a data point is from the past readings of the same set of variables. In other words, for a set of variables in an n-dimensional space, the value of the eccentricity increases as the values for this set of variables deviate from their "normal" behavior.

A convolution neural network (CNN) architecture can be trained to detect and classify actions in videos from eccentricity maps. In one aspect, an eccentricity map generated from video frames is provided to a CNN as input. The output can indicate if detected motion is or is not classified as an action, such as, for example, a hand gesture. In another aspect, video frames are input to one (e.g., an RGB) CNN and an eccentricity map generated from the video frames is input to another CNN. Outputs from the CNNs are fused to generate a final output. The final output can indicate if detected motion is or is not classified as an action, such as, for example, as a hand gesture.

Figure 1:
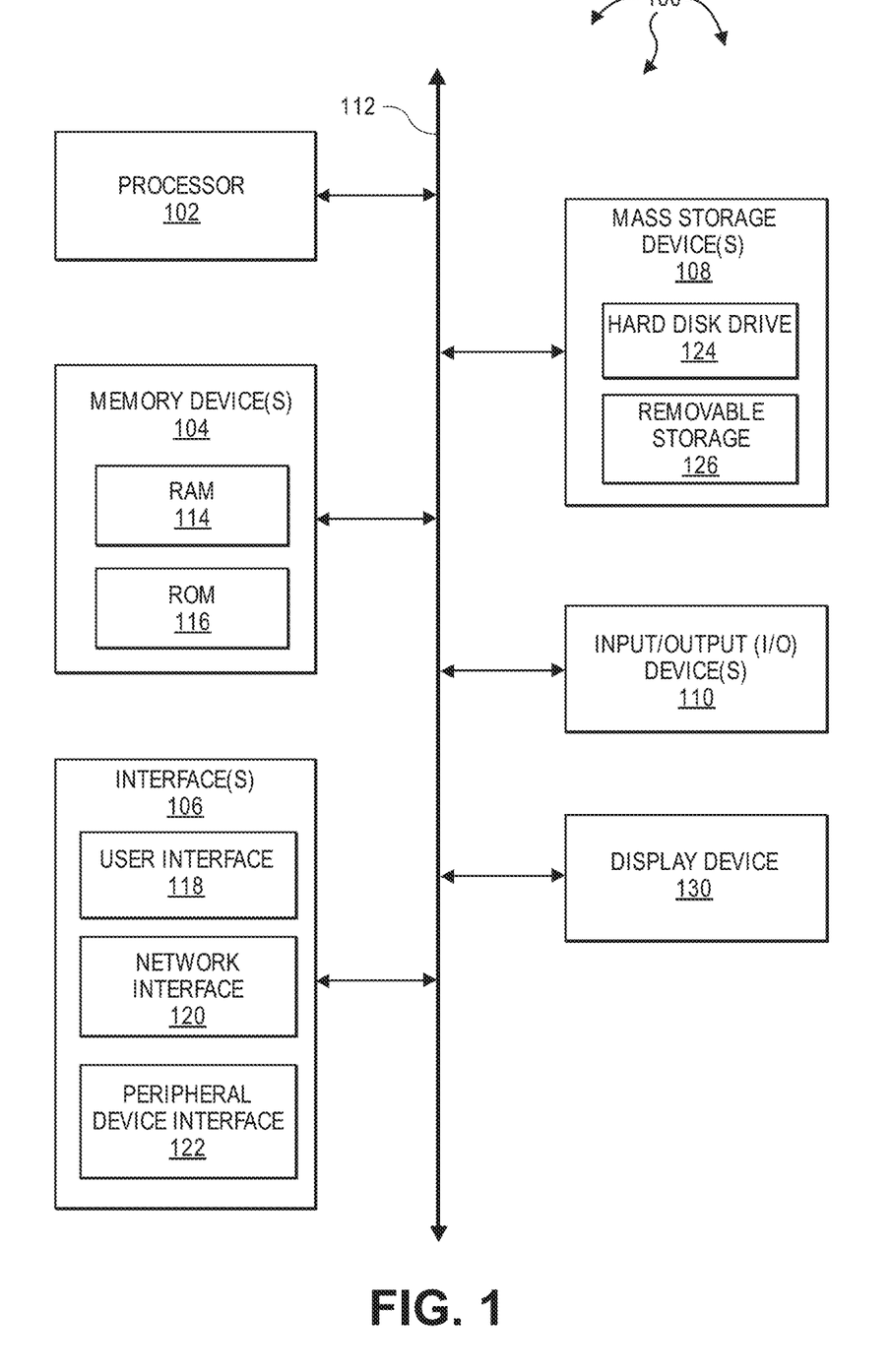
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
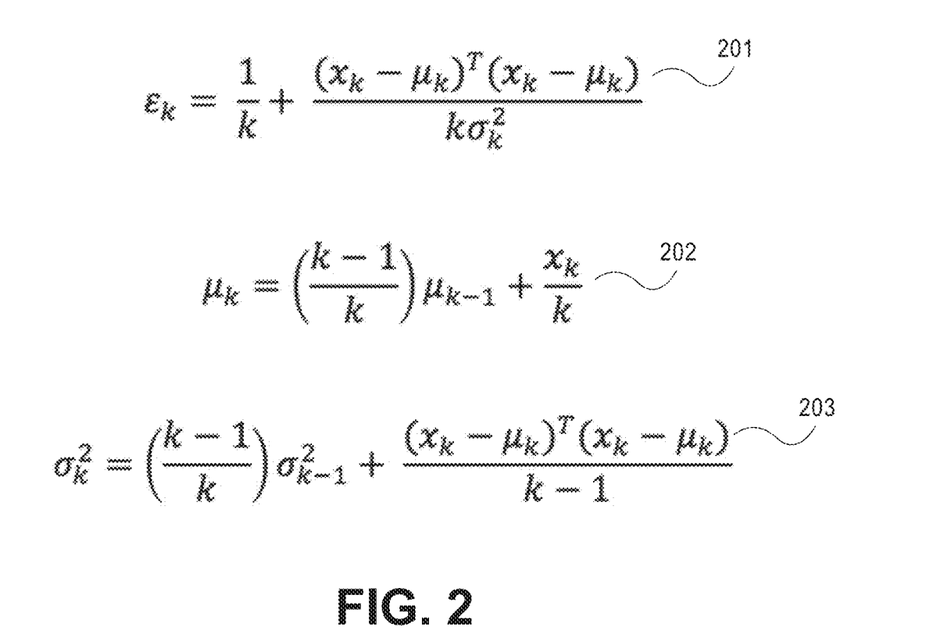
FIG. 2 illustrates example equations for computing eccentricity.

FIG. 2 illustrates example equations 201, 202, and 203 for computing an eccentricity. The eccentricity $\varepsilon_k$ of a vector data point x at time k can be computed according to equation 201. The mean (vector) $\mu_k$ of data samples read up to time k can be computed according to equation 202. The variance (scalar) $\sigma_k^2$ of data samples read up to time k can be computed according to equation 203. Values computed from equations 202 and 203 can be used in equation 201.

Figure 3:
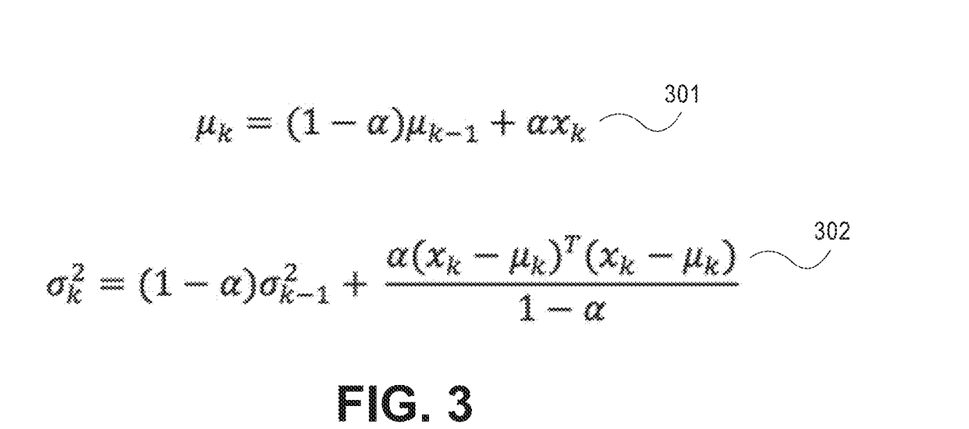
FIG. 3 illustrates example equations for computing data sample mean and data sample variance using a moving window approach.

FIG. 3 illustrates example equations 301 and 302 for computing eccentricity using a moving window approach. Using a moving window (finite memory), eccentricity $\varepsilon_k$ can be recursively computed facilitating essentially real-time processing of sequences of frames. A variable learning rate 1/k is replaced by a constant learning rate $\alpha$. The constant learning rate $\alpha$ can be a smaller value, such as, 0.05. The mean (vector) $\mu_k$ of data samples read up to time k can then be computed according to equation 301. The variance (scalar) $\sigma_k^2$ of data samples read up to time k can then be computed according to equation 302. Values computed from equations 301 and 302 can be used in equation 201.

Figure 4:
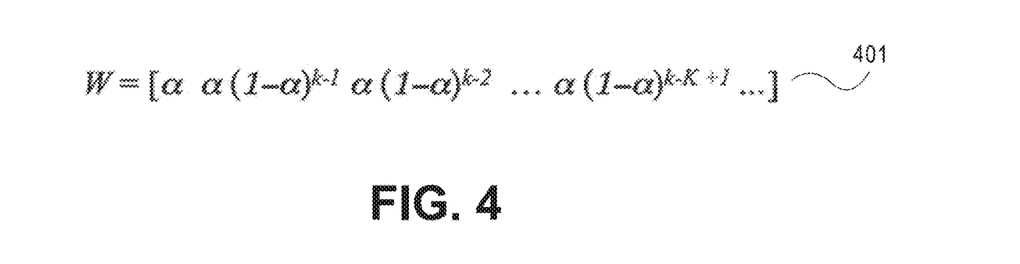
FIG. 4 illustrates an example equation for weighting frame observations.

FIG. 4 illustrates an example equation 401 for weighting frame observations. The introduction of constant factor $0 \leq \alpha \leq 1$ assigns a set of exponentially decreasing weights to older observations $x_k$ in accordance with equation 401 with unit sum. The vector W forms a weighted average type aggregating operator with exponentially decreasing weights that depend on $\alpha$. The elements of W with power greater than K are approaching zero, hence defining a moving window of width K. The width of the moving window K is approximately reciprocal to the forgetting factor K $1/\alpha$.

Figure 5:
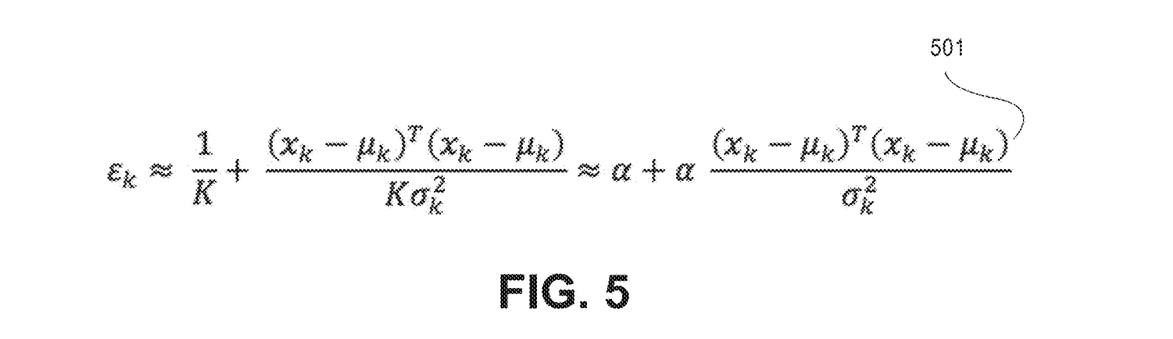
FIG. 5 illustrates an example equation for approximating eccentricity.

The expression for eccentricity $\varepsilon_k$ in equation 201 is defined for data samples read up to time k. By introducing the constant learning rate $\alpha$, the effect of the older data points (i.e., beyond k) is significantly minimized, if not virtually eliminated. FIG. 5 illustrates an example equation 501 for approximating eccentricity $\varepsilon_k$.

For image streams, $x_k^{i,j} = \{R_k^{i,j}, G_k^{i,j}, B_k^{i,j}\}$ can be considered the vector containing the intensities of the R, G and B channels of a pixel (i,j) of an image with a×b×3 dimensions, at a given time k. As such, each pixel (i,j) of the image generates an input vector $x_k^{i,j}$, resulting in a×b eccentricity outputs (the eccentricity of each pixel can be considered independent from the other pixels and treated as a separate data stream). Then, for each a×b×3 input image (RGB), an a×b×1 eccentricity map (gray scale) can be generated.

Figure 6:
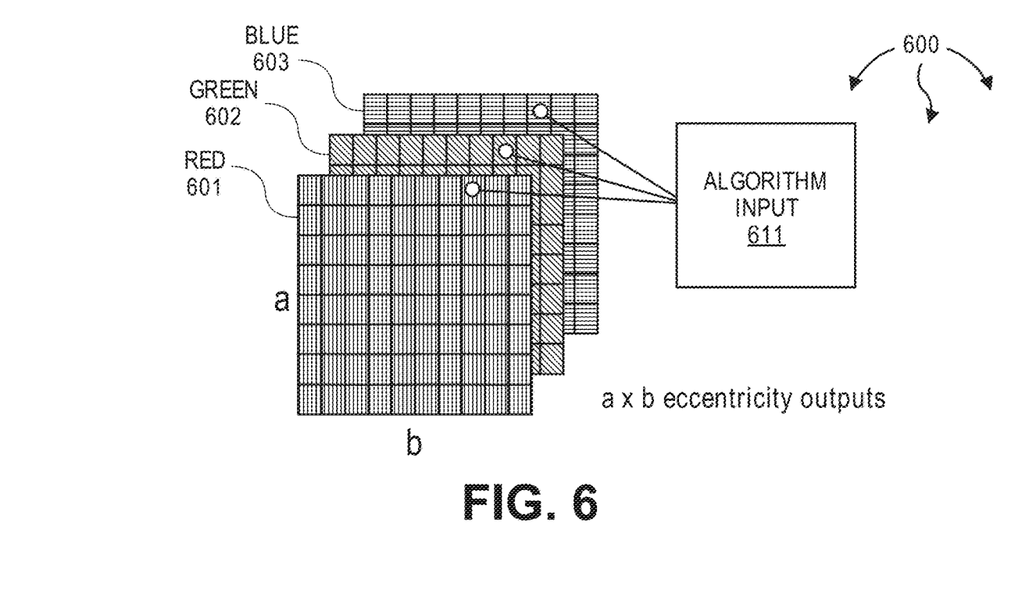
FIG. 6 illustrates an example computer architecture for computing an eccentricity map.

FIG. 6 illustrates an example algorithm input 600 (i.e., $x_k^{i,j} = \{R_k^{i,j}, G_k^{i,j}, B_k^{i,j}\}$) for an RGB image with a rows and b columns. As depicted, algorithm 600 includes single algorithm input 611 having dimensions a×b for each of Red 601, Green 602, and Blue 603.

In one aspect, eccentricity maps are computed from a specified prior number of video frames. For example, an eccentricity map computed at time t can be computed from a plurality of video frames (potentially immediately) prior to time t. In one aspect, the plurality of video frames can include 2 to 50 video frames. In another aspect, the plurality of video frames can include 5 to 30 video frames.

In another aspect, eccentricity maps are computed from frames spanning a specified period of time. For example, an eccentricity map computed at time t can be computed from any video frames within a specified period of time prior to time t. Thus, depending on frame rate (e.g., frames per second) the number of video frames used to compute eccentricity maps can vary. For example, for video with a frame rate of 60 fps twice as many frames would be used relative to video with a frame rate of 30 fps.

Figure 7:
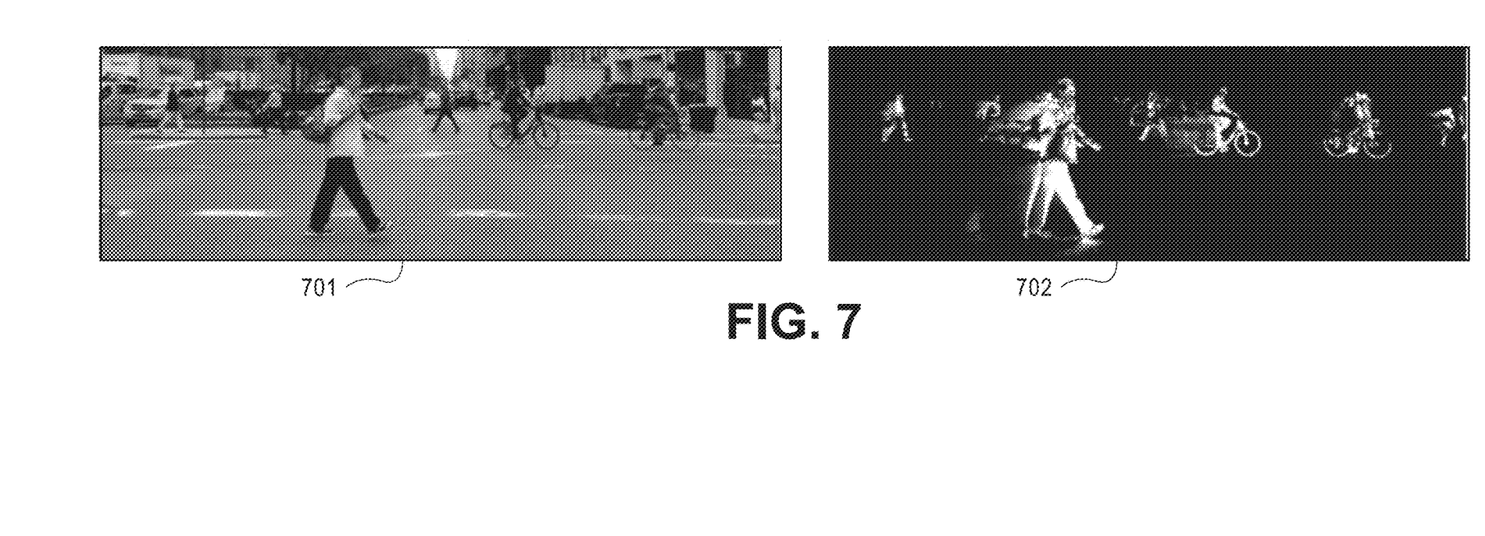
FIG. 7 illustrates an example video stream frame of a dynamic scene and an example eccentricity map based on past frames of the video stream.

FIG. 7 illustrates a frame 701 of a video stream of a dynamic scene and a corresponding eccentricity map 702 based on (e.g., the 20) past frames of the video stream. The motion of objects in the video stream is represented by horizontal lines in eccentricity map 702.

Figure 8A:
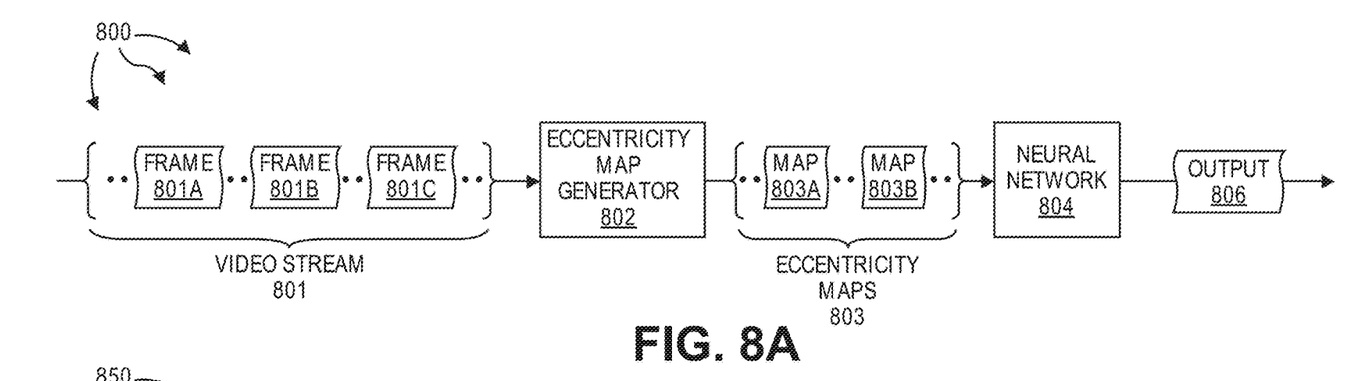
FIG. 8A illustrates an example computer architecture that facilitates classifying an action in a video stream.

FIG. 8A illustrates an example computer architecture 800 that facilitates classifying an action in a video stream. As depicted, computer architecture 800 includes eccentricity map generator 802 and neural network 804 (e.g., a convolutional neural network (CNN)).

Eccentricity map generator 802 is configured to generate one or more eccentricity maps from a plurality of frames of a (e.g., RGB) video stream. Eccentricity map generator 802 can implement any of equations 201, 202, 203, 301, 302, 401, or 501 to compute and/or approximate eccentricity maps. Neural network 804 is configured to classify an action in the video stream from generated eccentricity maps. In one aspect, eccentric map generator 802 generates eccentricity maps using a moving window approach to facilitates classification of actions in closer to real-time.

Figure 9A:
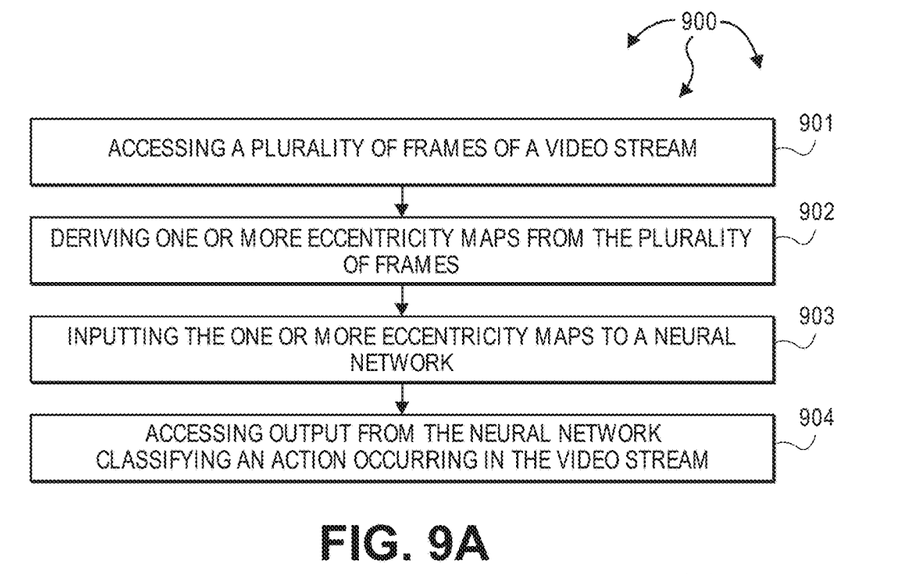
FIG. 9A illustrates a flow chart of an example method for classifying an action in a video stream.

FIG. 9A illustrates a flow chart of an example method 900 for classifying an action in a video stream. Method 900 will be described with respect to the components and data in computer architecture 800.

Method 900 includes accessing a plurality of frames of a video stream (901). For example, eccentricity map generator 802 can access frames 801A, 801B, 801C, etc. of video stream 801. Video stream 801 can be an RGB video stream. Video stream 801 can originate from an electronic or digital device, such as, for example, a video camera, system memory, or durable storage. Method 900 includes deriving one or more eccentricity maps from the plurality of frames (902). For example, eccentricity map generator 802 can derive eccentricity maps 803, including eccentricity maps 803A, 803B, etc., from frames 801A, 801B, 801C, etc. Each eccentricity map 803 can represent motion between a plurality of frames of video stream 801 in a static image.

Method 900 includes inputting the one or more eccentricity maps to a neural network (903). For example, eccentricity map generator 802 can input eccentricity maps 803 to neural network 804. Method 900 includes accessing output from the neural network classifying an action occurring in the video stream (904). For example, neural network 804 can classify an action (e.g., a gesture, a movement, etc.) occurring in video stream 801 from eccentricity maps 803A, 803B, etc. Neural network 804 can produce output 806 indicating the classified action occurring in video stream 801.

Figure 8B:
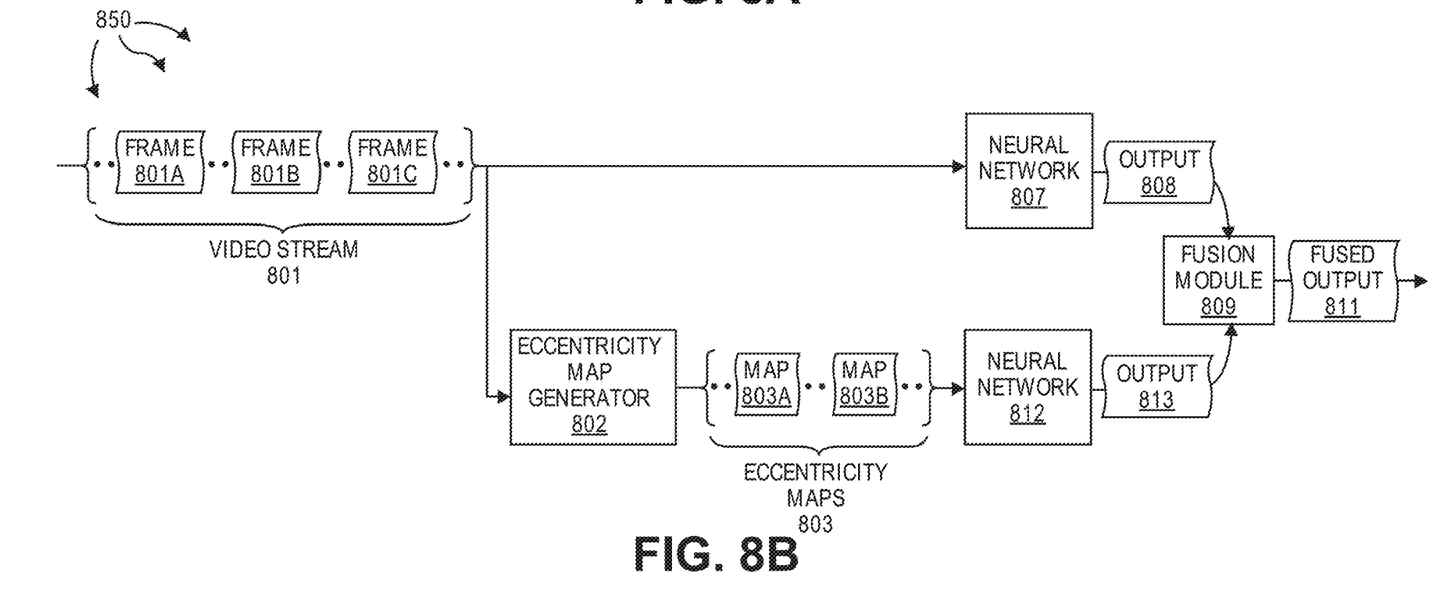
FIG. 8B illustrates another example computer architecture that facilitates classifying an action in a video stream.

FIG. 8B illustrates another example computer architecture 850 that facilitates classifying an action in a video stream. Computer architecture 850 further includes neural network 807, neural network 812, and fusion module 809. Neural network 807 (e.g., a convolutional neural network (CNN)) is configured to classify features of a video stream from a plurality of frames of the video stream. Neural network 812 (e.g., a convolutional neural network (CNN)) is configured to classify features of the video stream from one or more eccentricity maps generator from the video stream. Fusion module 809 is configured to fuse features output from neural network 807 with features output from neural network 812 to classify an action occurring in the video stream.

Fusion module 809 can more accurately classify actions relative to neural network 804. For example, neural network 807 can be used as an edge detector, where edges are followed by motion trails. Detecting edges increases the accuracy of action classification.

Figure 9B:
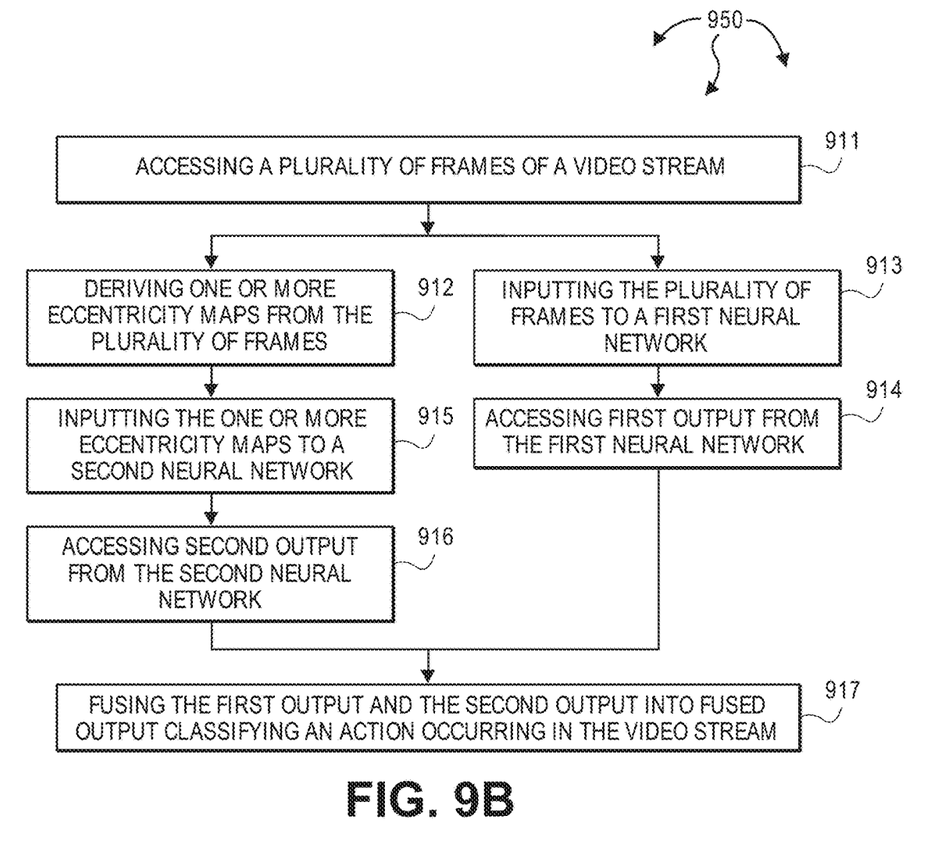
FIG. 9B illustrates a flow chart of another example method for classifying an action in a video stream.

FIG. 9B illustrates a flow chart of another example method 950 for classifying an action in a video stream. Method 950 will be described with respect to the components and data in computer architecture 850.

Method 950 includes accessing a plurality of frames of a video stream (911). For example, eccentricity map generator 802 can access frames 801A, 801B, 801C, etc. of video stream 801. Method 950 includes deriving one or more eccentricity maps from the plurality of frames (912). For example, eccentricity map generator 802 can derive eccentricity maps 803, including eccentricity maps 803A, 803B, etc., from frames 801A, 801B, 801C, etc.

Method 950 includes inputting the plurality of frames to a first neural network (913). For example, frames 801A, 801B, 801C, etc. can be input to neural network 807. Method 950 includes accessing first output from the first neural network (914). For example, fusion module 809 can access output 808 from neural network 807. Output 808 can classify one or more features of video stream 801 from frames 801A, 801B, 801C, etc.

Method 950 includes inputting the one or more eccentricity maps to a second neural network (915). For example, eccentricity map generator 802 can input eccentricity maps 803 to neural network 812. Method 950 includes accessing second output from the second neural network (916). For example, fusion module 809 can access output 813 from neural network 812. Output 813 can classify one or more features of video stream 801 from eccentricity maps 803A, 803B, etc.

Method 950 includes fusing the first output and the second output into fused output classifying an action occurring in the video stream (917). For example, fusion module 809 can classify an action (e.g., a gesture, a movement, etc.) occurring in video stream 801 by fusing classified features of video stream 801 in output 808 with classified features of video stream 801 in output 813. Fusion module 809 can produce fused output 811 indicating the classified action occurring in video stream 801.

Figure 10:
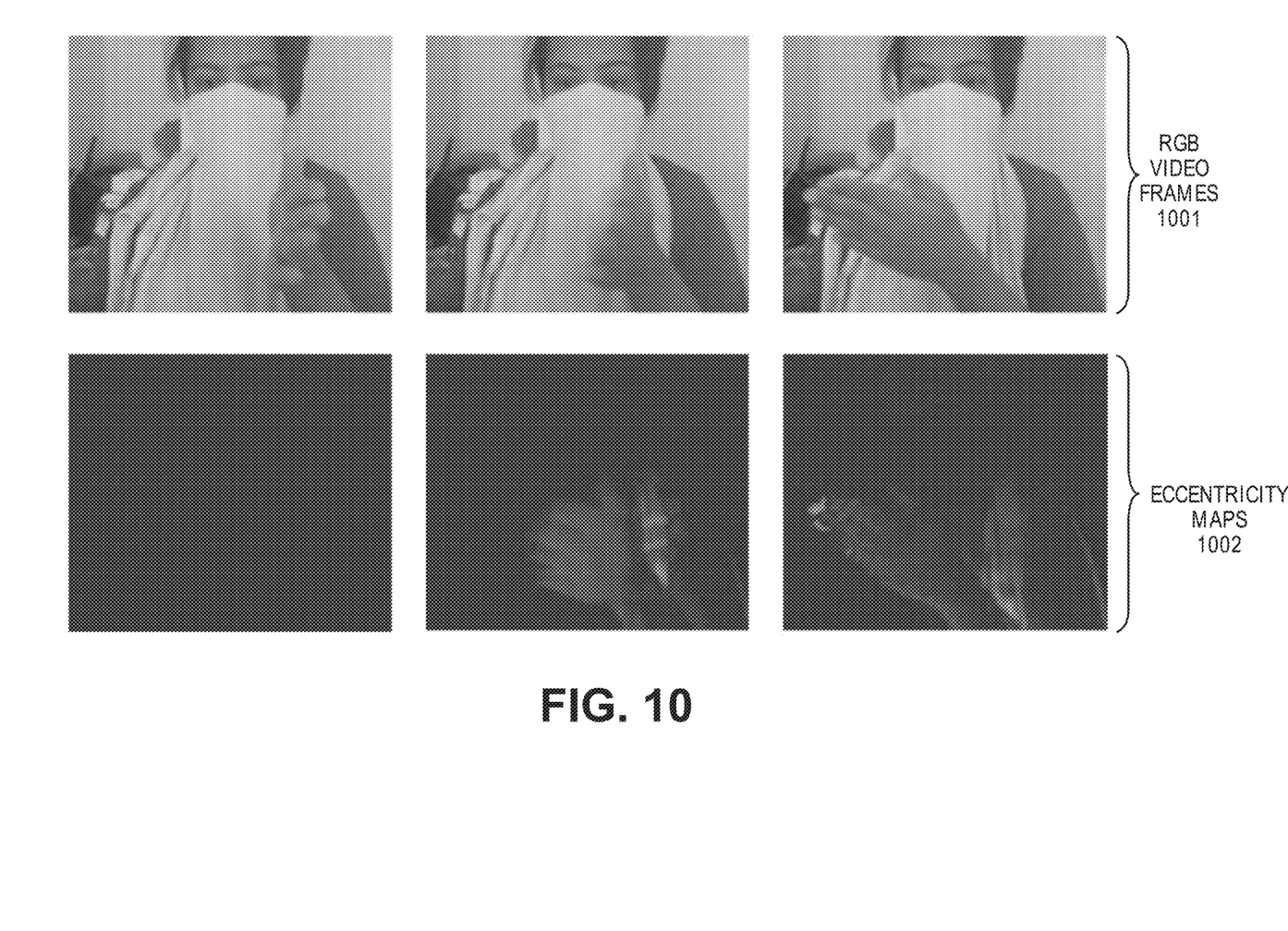
FIG. 10 illustrates an example of video frame sequence and corresponding example eccentricity maps.

FIG. 10 illustrates an example of RGB video frames 1001 and corresponding example eccentricity maps 1002. RGB video frames 1001 can be a sequence of frames from a video stream. Eccentricity maps 1002 can generated from RGB video frames 1001 as well as other RGB frames in the video stream.

Figure 11A:
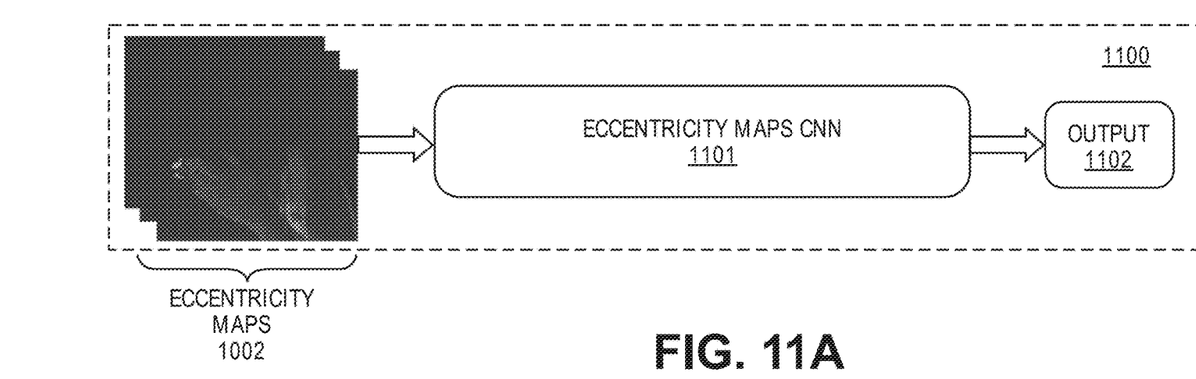
FIG. 11A illustrates an example architecture that facilitates classifying an action in a video stream.

FIG. 11A illustrates an example architecture 1100 that facilitates classifying an action in a video stream. Eccentricity maps 1002 can be provided as input to eccentric maps CNN 1101. Eccentricity maps CNN 1101 can classify an action (e.g., gestures, movement, etc.) in the video stream containing RGB video frames 1001 from eccentric maps 1002. Eccentricity maps CNN 1101 can indicate the classified action in output 1102.

Figure 11B:
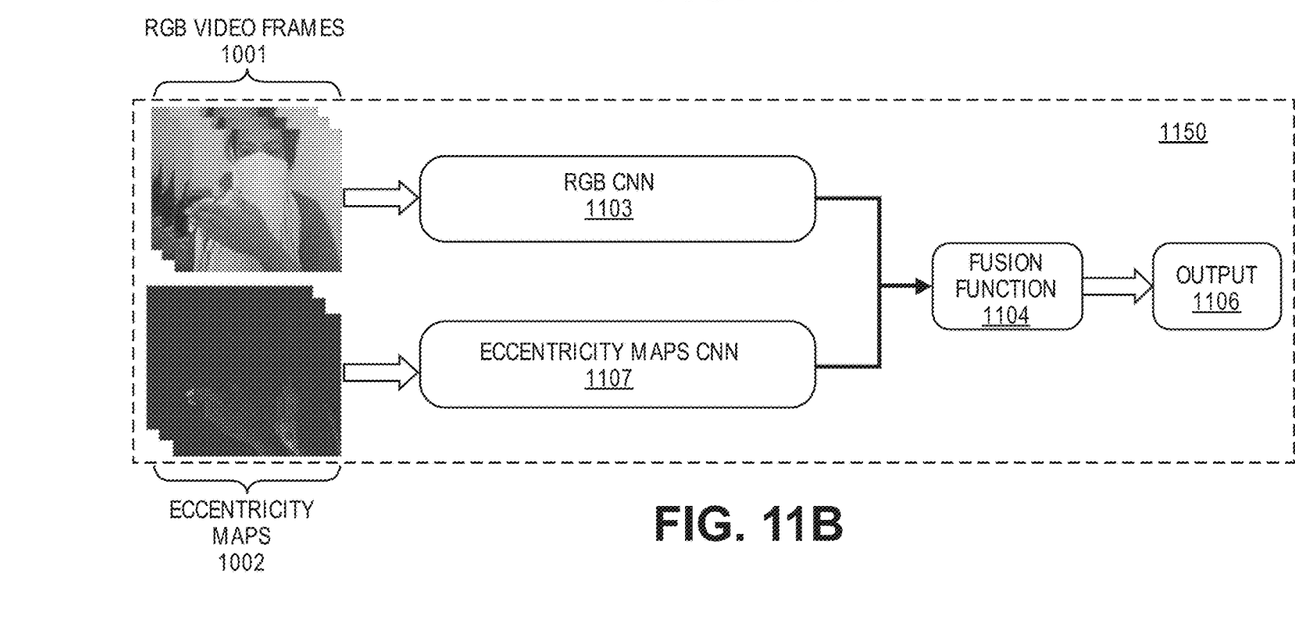
FIG. 11B illustrates another example architecture that facilitates classifying an action in a video stream.

FIG. 11B illustrates another example architecture 1150 that facilitates classifying an action in a video stream. RGB video frames 1001 can be provided as input to RGB CNN 1103. Eccentricity maps 1002 can be provided as input to eccentricity maps CNN 1107. Fusion function 1104 cam fuse output from RGB CNN 1103 with output from eccentricity maps CNN 1107 to classify an action (e.g., gestures, movement, etc.) in the video stream containing RGB video frames 1001. Fusion function 1104 can indicate the classified action in output 1106.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, video streams, frames, eccentricity maps, image classifications, neural network output, fused output, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, video streams, frames, eccentricity maps, image classifications, neural network output, fused output, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A method comprising:
inputting a plurality of frames of a video stream to a first neural network;
accessing first output from the first neural network;

encoding motion information from the plurality of frames in one or more eccentricity maps;
inputting the eccentricity maps to a second neural network;
accessing second output from the second neural network;
fusing the first output and second output into a fused output; and
classifying an action occurring in the video stream from the fused output.

2. The method of claim 1, wherein the fused output includes classified features of the first output and classified features of the second output.

3. The method of claim 1, wherein encoding motion information in the one or more eccentricity maps from the plurality of frames comprises deriving the one or more eccentricity maps from the plurality of frames using a moving window approach.

4. The method of claim 3, wherein encoding motion information in the one or more eccentricity maps from the plurality of frames using a moving window approach comprises deriving the one or more eccentricity maps using a constant learning rate and weighted average type aggregation.

5. The method of claim 1, wherein encoding motion information in the one or more eccentricity maps from the plurality of frames comprises determining the number of frames in the plurality of frames based on the frame rate of the video stream.

6. The method of claim 1, wherein inputting a plurality of frames of a video stream to a first neural network comprises inputting a plurality of frames of a RGB video stream to the first neural network.

7. The method of claim 1, further comprising:
the first neural network classifying first one or more features of the video stream from the plurality of frames; and
the second neural network classifying second one or more features of the video stream from the one or more eccentricity maps; and
wherein classifying an action occurring in the video stream from the fused output comprises classifying the action from a fusion of the first one or more features and the second one or more features.

8. The method of claim 1, wherein classifying an action occurring in the video stream from the fused output comprises classifying one of: a human intent, a gesture, a movement, or a video description.

9. A computer system, the computer system comprising:
a processor; and
system memory coupled to the processor and storing instructions configured to cause the processor to:
access a plurality of frames from a video stream;
input the plurality of frames to a first neural network;
derive one or more eccentricity maps from the plurality of frames;
input the one or more eccentricity maps to a second neural network;
access first output from the first neural network;
access second output from the second neural network; and
fuse the first output and second output into a fused output classifying an action occurring in the video stream from the fused output, wherein the fused output includes classified features of the first output and classified features of the second output.

10. The computer system of claim 9, wherein the instructions configured to derive the one or more eccentricity maps from the plurality of frames comprise instructions configured to derive the one or more eccentricity maps from the plurality of frames using a moving window approach.

11. The computer system of claim 10, wherein the instructions configured to derive the one or more eccentricity maps from the plurality of frames using a moving window approach comprise instructions configured to deriving the one or more eccentricity maps using a constant learning rate and weighted average type aggregation.

12. The computer system of claim 9, wherein the instructions configured to derive the one or more eccentricity maps from the plurality of frames comprise instructions configured to determine the plurality of frames from the frame rate of the video stream.

13. The computer system of claim 9, further comprising instructions configured to:
classify first one or more features of the video stream from the plurality of frames;
classify second one or more features of the video stream from the one or more eccentricity maps; and
classify the action from a fusion of the first one or more features and the second one or more features.

14. The computer system of claim 9, wherein the instructions configured to classify an action occurring in the video stream from the fused output comprise instructions configured to classify one of: a human intent, a gesture, a movement, or a video description.

15. The computer system of claim 9, wherein the instructions configured to access a plurality of frames from a video stream comprise instructions configured to access a plurality of frames from a RGB video stream.

16. A computer implemented method comprising:
accessing a first plurality of frames from a video stream;
approximating the per pixel eccentricity between the first plurality of frames using a constant learning rate and weighted average aggregation;
generating a first eccentricity map representing the per pixel eccentricity between the first plurality of frames;
accessing a second plurality frames from the video stream, the second plurality frames including at least one from frame from the first plurality of frames;
recursively approximating the per pixel eccentricity between the second plurality of frames using the constant learning rate and the weighted average aggregation;
generating a second eccentricity map representing the per pixel eccentricity between the second plurality of frames;
inputting the first eccentricity map and the second eccentricity map to a neural network; and
accessing output from the neural network classifying an action occurring in the video stream.

17. The method of claim 16, further comprising:
inputting frames from the first plurality of frames and from the second plurality of frames into a second neural network; and
accessing second output from the second neural network.

18. The method of claim 17, further comprising fusing the output with the second output increasing accuracy of classifying the action.

19. The method of claim 17, wherein accessing a first plurality of frames from a video stream comprises accessing a first plurality of frames from a RGB video stream.

20. The method of claim 17, further comprising the neural network classifying the action as one of: a human intent, a gesture, a movement, or a video description.

* * * * *